United States Patent [19]
Robinson

[11] 3,812,235
[45] May 21, 1974

[54] PROCESS FOR TREATING MAGNESIUM-BASE WASTE SULFITE LIQUOR

[75] Inventor: Murry Clinton Robinson, Don Mills, Ontario, Canada

[73] Assignee: Spring Chemicals Limited, Toronto, Ontario, Canada

[22] Filed: Sept. 22, 1971

[21] Appl. No.: 182,913

Related U.S. Application Data

[63] Continuation-in-part of Ser. No. 798,616, Feb. 12, 1969, abandoned.

[30] Foreign Application Priority Data

Feb. 12, 1968 Canada .............................. 12199

[52] U.S. Cl.................... 423/158, 162/29, 423/512
[51] Int. Cl............................................. D21c 11/00
[58] Field of Search ........... 423/158, 164, 165, 166, 423/512; 162/29, 36; 260/124

[56] References Cited
UNITED STATES PATENTS

| | | | |
|---|---|---|---|
| 2,644,748 | 7/1953 | Cunningham | 423/165 |
| 2,727,028 | 12/1955 | Russell et al. | 423/158 |

*Primary Examiner*—Edward J. Meros
*Attorney, Agent, or Firm*—Burns, Doane, Swecker & Mathis

[57] ABSTRACT

The amount of calcium contained in magnesium-base waste sulfite liquor is reduced by precipitating the calcium as calcium sulfite and separating the precipitate from the remaining waste sulfite liquor solution. The precipitation is caused by dissolving in the waste sulfite liquor (1) additional calcium, (2) additional magnesium, and (3) a source of sulfite ions. By "additional" calcium and magnesium is meant amounts greater than that contained in the magnesium-base waste sulfite liquor obtained from the pulping process.

4 Claims, No Drawings

PROCESS FOR TREATING MAGNESIUM-BASE WASTE SULFITE LIQUOR

RELATED CASES

The present application is a continuation-in-part of my copending application, Ser. No. 798,616, filed Feb. 12, 1969 now abandoned and titled "Process for Treating Waste Sulfite Liquor".

This invention relates to a process for treating magnesium-base waste sulfite liquor. More particularly, the present invention relates to a process for precipitating calcium from magnesium-base waste sulfite liquor as calcium sulfite.

BACKGROUND OF THE INVENTION

Sulfite pulping processes are a group of commonly used processes for obtaining pulp from wood or other cellulosic materials. In the sulfite processes, the cellulosic materials are normally treated with an aqueous solution containing an alkali metal bisulfite, alkaline earth metal bisulfite, or ammonium bisulfite. In some instances, when less sulfur dioxide is present in the aqueous solutions, all or portions of the metal or the ammonium cations may be present in the monosulfite form. In still other instances, excess sulfur dioxide may be present in the solutions, over and above the amount necessary to maintain the cations in the bisulfite form, thus giving rise to what is specifically referred to as an acid sulfite solution. All of these solutions are usually collectively or generically referred to as sulfite cooking liquors.

The sulfite cooking liquors dissolve much of the lignin, some of the hemi-cellulose, as well as other components of the cellulosic material employed, leaving the majority of the cellulose fibers undissolved. The undissolved cellulose fibers are separated from the solution and the remaining solution containing the dissolved components is known as waste sulfite liquor. The waste sulfite liquor has dissolved therein lignosulfonates and other organic and inorganic compounds of the cation used in the cooking liquor, and of any other cations that may have been present in the sulfite cooking liquor or the cellulosic material.

One of the commonly used sulfite cooking liquors contains magnesium as the principal cation, and accordingly, the resulting waste sulfite liquor is known as magnesium-base waste sulfite liquor.

The magnesium-base waste sulfite liquor solutions contain valuable chemicals such as organic and inorganic salts of magnesium, sulfur in various forms, and a number of organic constituents. As a result, efforts have been made to develop methods for recovering these valuable components, and particularly for recovering sulfur dioxide and magnesium for use in the preparation of fresh sulfite cooking liquor and for recovering heating values from the organics.

Some of the recovery processes suggested heretofore have included subjecting the magnesium-base waste sulfite liquor solutions to evaporation and burning operations to obtain an ash containing magnesium oxide. Unfortunately, because of the amounts of calcium compounds present in the waste liquor, serious scaling problems occur in the evaporators. The recovered ash is also contaminated by the calcium compounds.

The calcium present in magnesium-base waste sulfite liquor comes from the wood used in the pulping process, from impurities in the water used to make the sulfite cooking solution, and from the various chemicals used in the cooking process. The calcium compounds tend to build up if an ash is recovered and is re-used in the pulping process, thereby increasing the scaling problems.

One of the methods for reducing the calcium content involves contacting the magnesium-base waste sulfite liquor with sulfite ions (such as provided by the addition of sulfur dioxide) and magnesium hydroxide so as to precipitate calcium from the waste sulfite liquor as calcium sulfite. Reduction of the calcium content by this method permits the resulting waste sulfite liquor solution to be more effectively and economically processed by evaporation, burning and the like in order to recover the magnesium and other valuable components.

In order to significantly reduce the calcium content, however, it is normally necessary to use large amounts of magnesium hydroxide and sulfite ions. A process has now been found whereby less magnesium hydroxide and sulfite ions can be employed to obtain significant reductions in the amount of calcium present.

OBJECTS AND SUMMARY OF THE INVENTION

The primary object of the present invention is to provide a process for reducing the amount of calcium contained in magnesium-base waste sulfite liquor.

A further object is to provide a process for reducing the calcium content of magnesium-base waste sulfite liquor which is more economical and effective than those processes used heretofore.

Other objects of the present invention will be apparent to those skilled in the art from the following more detailed description.

According to the present invention, a source of sulfite ions, additional calcium and additional magnesium are dissolved in a magnesium-base waste sulfite liquor. These materials are added to the magnesium-base waste sulfite liquor to precipitate the calcium therefrom as calcium sulfite.

The terms "additional calcium" and "additional magnesium" as used herein mean calcium and magnesium in excess of the respective amounts present in the magnesium-base waste sulfite liquor obtained from the sulfite pulping process.

The essence of the present invention is the surprising discovery that by adding calcium to the magnesium-base waste sulfite liquor, any given level of calcium reduction can be obtained using less sulfite ions and less magnesium compound than when no added calcium is employed.

In its broadest aspect, the present invention is intended to cover dissolving any additional amount of calcium in the magnesium-base waste sulfite liquor in excess of the amount of calcium contained in the waste liquor recovered from the sulfite pulping process. In one of its preferred aspects, calcium is added in an amount sufficient to yield a waste sulfite liquor containing up to about 3,000 ppm of dissolved calcium prior to precipitation of calcium sulfite.

DETAILED DESCRIPTION OF THE PREFERRED EMBODIMENTS

The term "magnesium-base waste sulfite liquor" as used herein is intended to include all waste sulfite cooking liquors obtained from pulping processes wherein the original sulfite cooking liquor contains magnesium as the major or principal cation, on a weight basis. It is to be understood that the original sulfite cooking liquor can be of any specific type, ranging from neutral to the acid sulfite form depending on the amount of sulfur dioxide dissolved therein. The only requirement is that magnesium be the major or principal cation. Normally, magnesium-base waste sulfite liquors contain between about 2,000 and 6,500 ppm of magnesium, between about 250 and 600 ppm of calcium and below about 100 ppm of other cations such as strontium, barium, iron, aluminum, sodium, potassium and the like. The pH of the magnesium-base waste sulfite liquor as obtained from the pulping processes is normally between about 1.5 and 4.5.

The calcium in magnesium-base waste sulfite liquor is normally dissolved in the liquor in the form of various organic and inorganic salts such as lignosulfonates, oxalates, acetates and sulfates as well as in the form of calcium bisulfite.

By the use of the process of the present invention the calcium content of magnesium-base waste sulfite liquor can be reduced. If desired, the calcium level can be reduced to below about 100 ppm (based on the weight of the waste sulfite liquor solution). When the calcium level is below about 100 ppm, the magnesium-base waste liquor can be more effectively and economically processed to recover magnesium and other valuable components employing such techniques as evaporators, recovery boilers, absorbers and the like. This is because the scaling, if any, which occurs at such low calcium levels is not economically prohibitive. An additional advantage in obtaining low calcium levels is that the scaling problem which occurs in various pulping process equipment will be minimized, if not eliminated, for example, when magnesium cation is recovered for use in making fresh cooking liquor.

Most importantly, however, is that by the process of the present invention less sulfite ions and less magnesium ions, i.e., magnesium compound, are needed to effect the desired calcium reduction as compared to the prior art processes.

As previously mentioned, the present invention requires that additional magnesium be dissolved in the magnesium-base waste sulfite liquor, that is, in excess of the original amount of magnesium present in the magnesium-base waste sulfite liquor obtained from the pulping process. The source of additional magnesium may be any compound or material which will dissolve (or be dissolved by the presence of sulfite ions) in the magnesium-base waste sulfite liquor to provide dissolved magnesium, i.e., magnesium ions, therein. The magnesium compound or material used should not cause adverse side reactions, interfere with the precipitation of calcium sulfite and its recovery, or add any deleterious substance to the waste sulfite liquor.

Suitable magnesium compounds which may be used are magnesium hydroxide, magnesium oxide, magnesium carbonate and magnesium sulfite. In addition, minerals or ores containing magnesium compounds may also be used, such as dolomite ($CaCO_3 \cdot MgCO_3$), brucite $MgO \cdot H_2O$), and magnesite ($MgCO_3$). These minerals when found in nature normally have extraneous material associated with them which may be removed to form concentrates, and it is understood that these expressions include concentrates of the minerals as well as the minerals themselves.

Mixtures of the above magnesium compounds and minerals may be employed, for example, magnesium sulfite and magnesium hydroxide, or magnesium sulfite and dolomite, and the like. Preferably, magnesium hydroxide, magnesium sulfite or dolomite is used.

Additional calcium is also dissolved in the magnesium-base waste sulfite liquor, that is, in excess of the original amount of calcium present in the magnesium-base waste sulfite liquor obtained from the pulping process.

The source of additional calcium may be any compound or material which will dissolve (or be dissolved by the presence of sulfite ions) in the magnesium-base waste sulfite liquor to provide dissolved calcium, i.e., calcium ions, therein. As with the additional magnesium, the calcium compound or material used should not cause adverse side reactions, interfere with the precipitation of calcium sulfite and its recovery, or add any deleterious substance to the waste sulfite liquor. Several calcium compounds that may be used include calcium hydroxide, calcium oxide, calcium carbonate, calcium sulfite, and minerals containing calcium such as dolomite, brucite, limestone and chalk.

Any additional amount of calcium may be dissolved in the magnesium-base waste sulfite liquor in accordance with the present invention. As previously mentioned, the additional calcium will enable the desired calcium reduction to take place with the use of less dissolved magnesium and less sulfite ions. In other words, if it is desired to reduce the calcium content of a magnesium-base waste sulfite liquor from 300 ppm to, for example, 100 ppm, less magnesium compound or material and less sulfite ions will be used when additional calcium is added as compared to when no additional calcium is added.

While any amount of additional calcium may be dissolved in the waste sulfite liquor in accordance with the present invention, preferably, the additional calcium is dissolved in amounts such that the waste sulfite liquor contains up to about 3,000 ppm of calcium dissolved therein, based on the weight of the waste sulfite liquor solution, (this includes the calcium already dissolved in the original waste liquor obtained from the pulping process).

Moreover, each incremental addition of dissolved calcium will normally give a further improvement. That is, raising the dissolved calcium level to 700 ppm will usually require less dissolved magnesium and sulfite ions to obtain a certain calcium reduction as compared to raising the dissolved calcium level to only 500 ppm. A further raise in the dissolved calcium level to 900 ppm will usually require still lower amounts of the other ingredients, and so on.

A particularly preferred method for reducing the calcium content of magnesium-base waste sulfite liquor includes dissolving one or more of the above calcium compounds or materials in the liquor to obtain up to about 3,000 ppm and preferably between about 1,000 and 3,000 ppm of dissolved calcium; and dissolving one or more of the above magnesium compounds or materials in the liquor to obtain above about 8,000 ppm, and preferably between about 10,000 and 15,000 ppm of magnesium, based on the weight of the waste sulfite liquor solution, dissolved in the liquor.

If more than about 50 ppm of ammonia, sodium and/or potassium are dissolved in the magnesium-base waste sulfite liquor, the respective amounts of ammonia, sodium and potassium should be converted to magnesium equivalents and included in the total dissolved magnesium figure. The ppm of dissolved ammonia are converted to magnesium equivalent by multiplying the ppm of ammonia by a factor of 0.715. The ppm of dissolved sodium are multiplied by 0.529 and the ppm of dissolved potassium by 0.311 to convert each to ppm of dissolved magnesium equivalents. Thus, the term "magnesium cation equivalents" as used herein means the ppm of dissolved magnesium plus magnesium equivalents of dissolved ammonia, sodium and/or potassium when the latter materials are dissolved in the waste sulfite liquor alone or in combination in excess of about 50 ppm. The above limits of above about 8,000 ppm and preferably between about 10,000 and 15,000 ppm also apply to the magnesium cation equivalents.

It is important to note that the ppm of dissolved magnesium, ammonia, sodium and/or potassium are to include not only the amounts that may be added during the calcium removal treatment, but also the amounts present in the original magnesium-base waste sulfite liquor obtained from the pulping process.

The above amounts of dissolved calcium and magnesium should be obtained in the waste sulfite liquor solution before the calcium sulfite precipitation is complete. For example, some of the calcium and magnesium requirements may be added as calcium sulfite is precipitating, provided the total desired amount is dissolved in the waste sulfite liquor before completing precipitation. With respect to the calcium, it is preferred that all of the additional calcium which is to be added, be dissolved in the waste sulfite liquor before any calcium sulfite precipitation occurs, for example, prior to raising the pH of the waste sulfite liquor solution above about 4.0.

In addition to the added calcium and the added magnesium, the magnesium-base waste sulfite liquor is also provided with a source of sulfite ions. The presence of sulfite ions in the waste sulfite liquor serves several functions. First, sufficient sulfite ions must be available to dissolve the magnesium and calcium compounds or materials that are added to the waste sulfite liquor. In addition, sulfite ions must be provided to combine with calcium, and under the reaction conditions used, to cause calcium to precipitate as calcium sulfite. Furthermore, the sulfite ions assist in adjusting the pH of the waste sulfite liquor, for example, by keeping the pH from rising above the desired level as the magnesium and calcium components are added.

Any convenient source of sulfite ions may be used in the present invention such as sulfur dioxide, magnesium sulfite, ammonium sulfite, calcium sulfite and sodium sulfite. Preferably, sulfur dioxide or magnesium sulfite is used.

In the instances when it is necessary to provide sulfite ions for purposes of dissolving calcium and/or magnesium compounds or materials, the sulfite ion source is normally sulfur dioxide.

The sulfite ions are usually provided in sufficient amount to adjust the pH so that at the completion of the dissolution of the added calcium and added magnesium the pH of the waste sulfite liquor is between about 5 and 7, preferably between about 5.5 and 6.5, and more particularly at about 5.7. Under these conditions calcium contained in the waste sulfite liquor precipitates as calcium sulfite. If it is desired to precipitate calcium sulfite without any substantial amount of precipitation of magnesium salts, the pH should preferably not exceed about 6.0. Substantial precipitation of magnesium salts would normally exist when the resulting precipitate contains above about 3 by per cent weight of magnesium salts based on the total weight of the washed precipitate.

The calcium sulfite precipitate is separated from the remaining waste sulfite liquor solution by any conventional technique such as filtration, settling and the like.

The additional calcium, additional magnesium and sulfite ions may be added to the magnesium-base waste sulfite liquor in any convenient manner known to those skilled in the art and in any order desired. One preferred sequence, however, is to maintain the pH of the waste sulfite liquor below about 4 (such as by the addition of sulfur dioxide) until all of the additional calcium to be added is dissolved and a major portion of the magnesium to be added is dissolved, and then add the remaining magnesium along with more sulfur dioxide, if needed, to reach the desired final pH.

The addition of the above substances to the waste sulfite liquor as well as the precipitation and separation of calcium sulfite precipitate from the remaining solution is conveniently conducted at atmospheric pressure and at a temperature of above about 50°C., such as between about 60° and 100°C., and preferably between about 70° and 95°C. If desired, higher pressures and temperatures can be used provided adverse reactions are avoided.

Once the added magnesium and added calcium are dissolved in the waste sulfite liquor solution and the final desired pH is obtained, up to about 30 minutes or more of residence time is usually sufficient to obtain completion of calcium sulfite precipitation.

After the calcium sulfite precipitate is removed from the remaining waste sulfite liquor solution it may be treated to obtain calcium compounds and sulfur dioxide. The waste solution remaining, i.e., filtrate, can be treated to obtain magnesium compounds as well as other valuable components. This may be accomplished, for example, by concentrating the remaining solution by evaporation, and burning the concentrate autogeneously to produce sulfur dioxide and magnesium oxide. Because of the reduced calcium level in the waste sulfite liquor, scaling problems are minimized and desirably eliminated. Other recovery processes known to those skilled in the art may also be employed. The recovered magnesium oxide may be used to prepare new sulfite cooking liquor, the preparation of which forms no part of the present invention.

The following examples illustrate methods of carrying out the present invention.

EXAMPLES

The following Table I contains a listing of 30 experiments, denoted as Run Nos. 1 to 30, which were conducted to demonstrate the results that can be obtained by the process of the present invention.

Magnesium-base waste sulfite liquor was obtained from a pulping process and was analyzed to determine its calcium and magnesium contents.

Each of the magnesium-base waste sulfite liquors used in the Runs 1 to 30 were found to contain 300 ppm of calcium, all of which was dissolved in the liquor. However, the liquors, as obtained from the pulping process, contained varying amounts of magnesium, as can be seen in Column 3 of the Table I.

The pH of the liquors as received from the pulping mills was about 3.

In Runs 1 to 5 no additional calcium was added to the liquor. However, in each of the remaining Runs various amounts of calcium hydroxide were added to the liquors. For example, in runs 6 to 10 it can be seen from Column 2 of the Table that 155 ppm of additional calcium were dissolved in the waste sulfite liquor feed to obtain a total of 455 ppm. As indicated in Column 2, the additional calcium was dissolved prior to any calcium sulfite precipitation.

In each of the Runs 1 to 30 magnesium hydroxide was also added to the waste sulfite liquor feed in order to dissolve additional magnesium ions in the liquor. The amount of magnesium added in each run is the difference between Column 4 and Column 3.

Sulfur dioxide was used in each run to assist in dissolving the calcium hydroxide and magnesium hydroxide in the liquor, and to adjust the pH of the liquor to a final value of 5.7.

In each run the liquor was held at the final pH of 5.7 for 20 minutes, with continuous stirring. The temperature of the liquor was held constant at 70°C.

At the end of the 20 minute period calcium sulfite precipitation had been completed. A sample of the solution was taken, the precipitate separated therefrom by filtration and the filtrate analyzed.

Column 4 of Table I lists the amount of magnesium which was dissolved in the filtrate and Column 5, the ppm of calcium.

TABLE I

| Run No. | Ca (ppm) Dissolved in WSL Prior to Precipitation | Mg (ppm) in WSL Obtained from Pulping Process | Mg (ppm) In Filtrate | Ca (ppm) In Filtrate |
|---|---|---|---|---|
| 1 | 300 | 5,400 | 9,400 | 380 |
| 2 | 300 | 5,400 | 10,500 | 305 |
| 3 | 300 | 5,400 | 11,300 | 245 |
| 4 | 300 | 4,800 | 12,100 | 129 |
| 5 | 300 | 4,800 | 15,000 | 98 |
| 6 | 455 | 5,300 | 8,800 | 171 |
| 7 | 455 | 5,300 | 10,500 | 121 |
| 8 | 455 | 5,300 | 11,600 | 110 |
| 9 | 455 | 5,400 | 12,200 | 116 |
| 10 | 455 | 5,400 | 15,100 | 103 |
| 11 | 985 | 5,500 | 8,000 | 315 |
| 12 | 985 | 5,500 | 9,100 | 168 |
| 13 | 985 | 5,500 | 10,000 | 138 |
| 14 | 985 | 5,500 | 11,500 | 118 |
| 15 | 985 | 5,500 | 15,100 | 95 |
| 16 | 1140 | 5,800 | 8,100 | 262 |
| 17 | 1140 | 5,800 | 8,360 | 152 |
| 18 | 1140 | 5,800 | 10,400 | 116 |
| 19 | 1140 | 5,800 | 11,300 | 104 |
| 20 | 1140 | 5,800 | 14,900 | 86 |
| 21 | 1200 | 5,500 | 7,900 | 214 |
| 22 | 1200 | 5,500 | 8,900 | 154 |
| 23 | 1200 | 5,500 | 9,400 | 108 |
| 24 | 1200 | 5,500 | 10,900 | 99 |
| 25 | 1200 | 5,500 | 13,500 | 86 |
| 26 | 1690 | 4,900 | 6,500 | 220 |
| 27 | 1690 | 4,900 | 7,600 | 132 |
| 28 | 1690 | 4,900 | 8,900 | 101 |
| 29 | 1690 | 4,900 | 9,900 | 89 |
| 30 | 1690 | 4,900 | 13,200 | 81 |

As can be seen from the above Table, when calcium is added to the magnesium-base WSL lower amounts of magnesium ions are required. Compare, for example, Runs 5 and 24. In the former, 15,000 ppm magnesium cations were required to reduce the calcium level from 300 ppm to 98 ppm, while in the latter, when 900 ppm of additional calcium were added, only 10,900 ppm of magnesium cations were needed. About 4,800 more ppm of magnesium was added in Run 5. The few variations in the above data such as Run 10 are within the ranges of experimental error. When magnesium sulfite is used similar results are obtained.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. A process for treating magnesium-base waste sulfite liquor containing between about 2,000 and 6,500 ppm of magnesium and between about 250 and 600 ppm of calcium in order to reduce the amount of calcium contained therein by precipitating calcium from the waste sulfite liquor as calcium sulfite, which process comprises:

a. adding to said waste sulfite liquor a member selected from the class consisting of magnesium hydroxide, magnesium oxide, magnesium sulfite, magnesium carbonate, dolomite, brucite and magnesite so as to obtain a waste sulfite liquor solution containing above about 8,000 ppm of magnesium cation equivalents dissolved therein;

b. adding to said waste sulfite liquor a member selected form the class consisting of calcium hydroxide, calcium oxide, calcium carbonate, calcium sulfite, brucite, limestone, chalk and dolomite so as to obtain a waste sulfite liquor solution containing between about 1,000 and 3,000 ppm of calcium dissolved therein;

c. adding to said waste sulfite liquor a member selected form the class consisting of sulfur dioxide, magnesium sulfite, ammonium sulfite, calcium sulfite and sodium sulfite so as to provide sulfite ions in said waste sulfite liquor in at least an amount sufficient to cause the calcium contained therein to precipitate as calcium sulfite;

d. maintaining the pH of the waste sulfite liquor solution between about 5 and 7 during calcium sulfite precipitation; and e. separating said precipitated calcium sulfite from the remaining waste sulfite liquor solution.

2. The process of claim 1 step (a) wherein between about 10,000 and 15,000 ppm of magnesium cation equivalents are dissolved therein.

3. The process of claim 2 wherein sulfur dioxide is added to provide the sulfite ions in said waste sulfite liquor.

4. The process of claim 3 wherein the pH of the waste sulfite liquor solution is between about 5.5 and 6.5 during the calcium sulfite precipitation.

* * * * *